United States Patent [19]
Schuster et al.

[11] Patent Number: 5,933,524
[45] Date of Patent: Aug. 3, 1999

[54] METHOD FOR SEGMENTATION OF DIGITAL COLOR IMAGES

[75] Inventors: Rolf Schuster, München, Germany; Subutai Ahmad, Palo Alto, Calif.

[73] Assignee: Siemens Aktiengesellschaft, Munich, Germany

[21] Appl. No.: 08/591,510

[22] PCT Filed: Sep. 26, 1994

[86] PCT No.: PCT/DE94/01117

§ 371 Date: Feb. 7, 1996

§ 102(e) Date: Feb. 7, 1996

[87] PCT Pub. No.: WO95/09403

PCT Pub. Date: Apr. 6, 1995

[30] Foreign Application Priority Data

Sep. 27, 1993 [DE] Germany .................. 43 32 878

[51] Int. Cl.⁶ .................................................. G03F 3/08
[52] U.S. Cl. .................. 382/168; 382/171; 382/173; 382/162; 358/522
[58] Field of Search .................................. 382/170, 171, 382/199, 190, 168, 166, 165, 167, 162, 173, 164, 224, 225; 358/522, 538, 518

[56] References Cited

U.S. PATENT DOCUMENTS

| | | | |
|---|---|---|---|
| 5,179,597 | 1/1993 | Takeo | 382/168 |
| 5,222,154 | 6/1993 | Graham et al. | 358/522 |
| 5,247,583 | 9/1993 | Kato et al. | 382/225 |
| 5,475,492 | 12/1995 | Yukawa | 382/168 |
| 5,546,475 | 8/1996 | Bolle et al. | 382/170 |
| 5,585,944 | 12/1996 | Rodriguez | 382/164 |

*Primary Examiner*—Edward L. Coles
*Assistant Examiner*—Cheukfan Lee
*Attorney, Agent, or Firm*—Hill & Simpson

[57] ABSTRACT

Colored objects are represented by digitized color histograms which are used for the segmentation of digital color images. In this case, the binary values of the color histograms correspond to the decision as to whether a pixel can or cannot belong to a given object segment. Model-based parameterizations of these color histograms are preferred for the efficient execution of the segmentation. In particular, they permit adaptation of the color histograms to temporally varying lighting conditions with acceptable expense.

9 Claims, 4 Drawing Sheets

METHOD FOR SEGMENTATION OF DIGITAL COLOR IMAGES

BACKGROUND OF THE INVENTION

The invention relates to a method for the segmentation of digital color images on the basis of color histograms. Interest in color image processing has grown substantially in recent years. This fact reflects the desire to render color useful as an additional source of information and is supported by substantially increased computing power and new knowledge in the field of reflection models (Shafer, S. A. Optical phenomena in computer Vision, Proceedings of the CSCSI-84, Canadian Society for Computational Studies of Intelligence, London, Ontario, Canada, May 1984), (Nayar, S. K., Ikeuchi, K., und Kanada, T. Surface Reflection: Physical and Geometrical Perspectives, PAMI 13,7 (July 1991), 611–634). The so-called color histogram is an important tool which is used in many fields of color image processing. The literature contains descriptions of various applications of color histograms for color image segmentation (Celenk, M. A., Color Clustering Technique for Image Segmentation, Computer Vision, Graphics and Image Processing 52 (1990), 145–170) for color object recognition (Swain, M. J. and Ballard, D. H., Color Indexing. International Journal of Computer Vision 7 (1991), 11–32) and for three-dimensional reconstruction (Sato, Y. and Ikeuchi, K., "Temporal-Color Space Analysis", Carnegie-Mellon-University, Technical Report No. CMU-CS-92-207, November 1992). Only the principal components of the object histograms are investigated in these known works; various important items of information relating to the color histograms such as highlights, but also disturbing influences such as camera noise and overdriving are lost. The known forms of the applications of color histograms for object segmentation are therefore frequently not flexible enough to take account of different reflective properties and lighting conditions in the presence of diverse objects.

SUMMARY OF THE INVENTION

It is an object of the invention to specify a method for the segmentation of digital color images which is more flexible than the known methods, particularly with regard to a correct description of the most varied reflective properties of diverse objects.

This object is achieved according to the invention by means of a method for the segmentation of digital color images with the aid of an electronic data processing system wherein at least one digitized color histogram which describes the characteristic color properties of the at least one imaged object is used for determining whether a pixel of a color image which is to be decomposed into object segments belongs to a specific object segment or not. A check is carried out to determine whether there is assigned to the color value of said pixel a value of the digitized color histogram belonging to this object which indicates the association of said pixel with said specific object segment. In the method according to the invention, colored objects are represented by digitized color histograms, and are used for the segmentation of digital color images. In this case, the binary values of the color histograms correspond to a decision as to whether a pixel can or cannot belong to a given object segment. Model-based parameterizations of these color histograms are preferred for the efficient execution of the segmentation. They permit, in particular, adaptation of the color histograms to temporarily varying lighting conditions with acceptable expense. This embodiment is shown in FIG. 1.

In the method according to the invention for the segmentation of digital color images, at least one digitized color histogram which describes the characteristic color properties of at least one imaged object is used for the purpose of determining whether a pixel of a color image which is to be decomposed into object segments belongs to a specific object segment or not, it being checked whether there is assigned to the color value of this pixel a value of the digitized color histogram belonging to this object which indicates the association of this pixel with this object segment. In a preferred embodiment of the method according to the invention, the digitized color histograms are stored in the data processing system in the form of a table of binary values which assigns a first binary value to each color value which belongs to an object characterized by this color histogram, and assigns the opposite binary value to all other color values. This embodiment is shown in FIG. 2.

As an alternative to this, in a second preferred embodiment of the method according to the invention the values of digitized color histograms are determined by applying a threshold operation to a normalized color histogram, this normalized color histogram being stored in the data processing system, not in the form of a table of values, but as a set of parameters of a parametric function or as a set of parametric functions. This embodiment is shown in FIG. 3.

In an application of the method according to the invention to temporal sequences of digital images, the values of these parameters are adapted in a stepwise fashion to a temporally varying lighting situation. Preferably, but not necessarily, three-dimensional color histograms, for example in so-called RGB space, are used in conjunction with the methods according to the invention.

DESCRIPTION OF THE PREFERRED EMBODIMENTS

Figure 1:
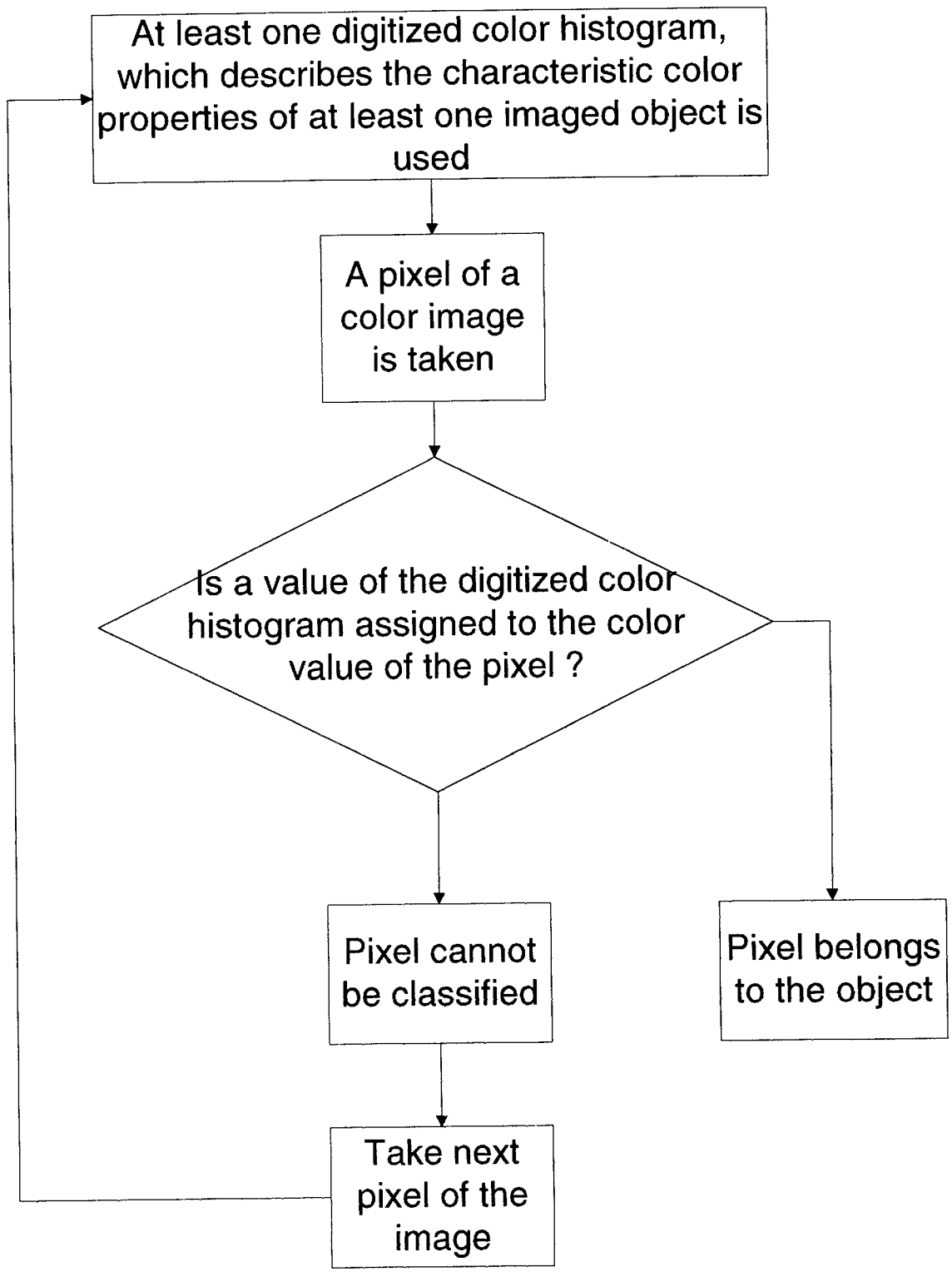
FIG. 1 is a flow chart showing the method for the segmentation of digital color images according to a first embodiment of the invention.
Figure 2:
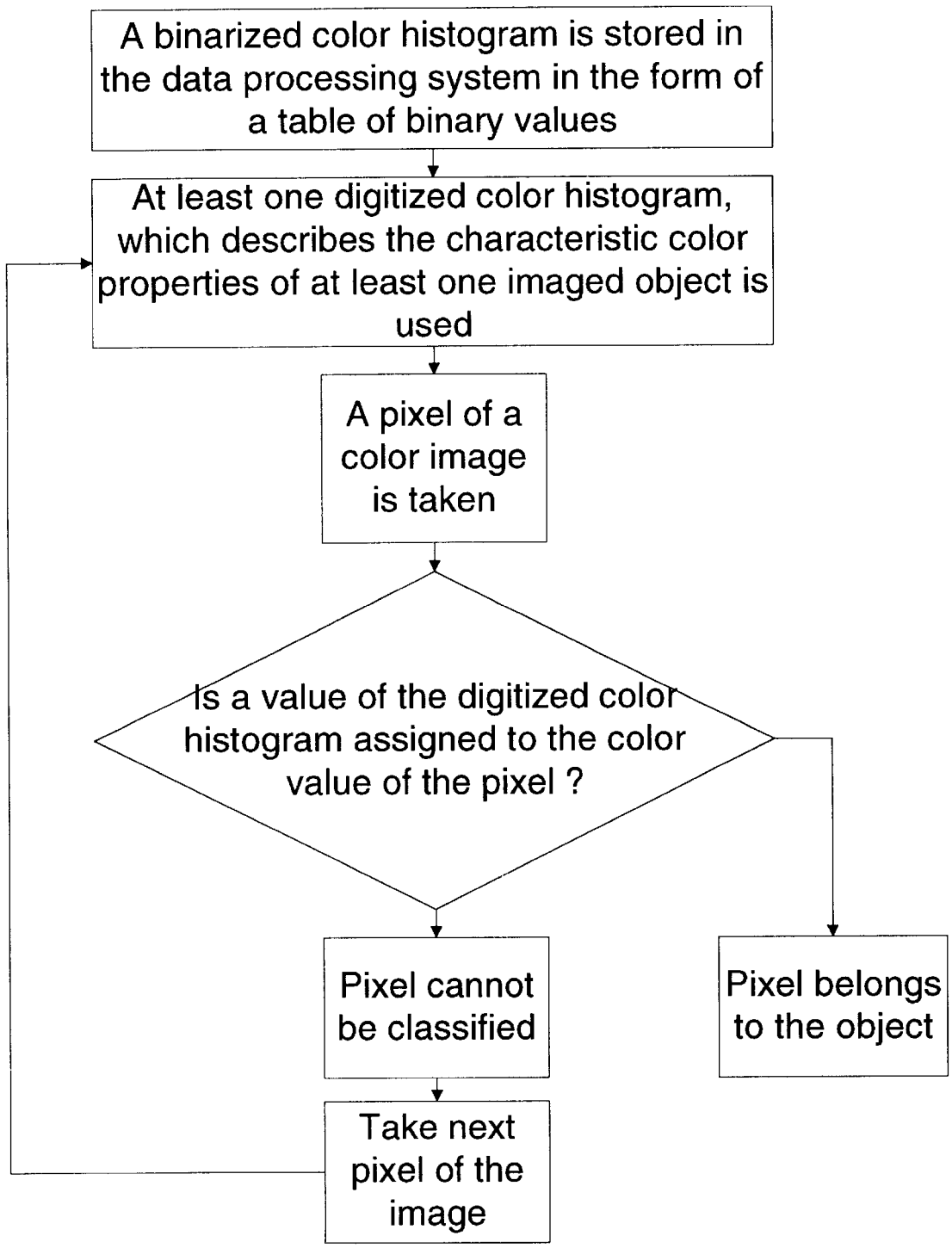
FIG. 2 is a second embodiment of the method of the invention for the segmentation of digital color images.
Figure 3:
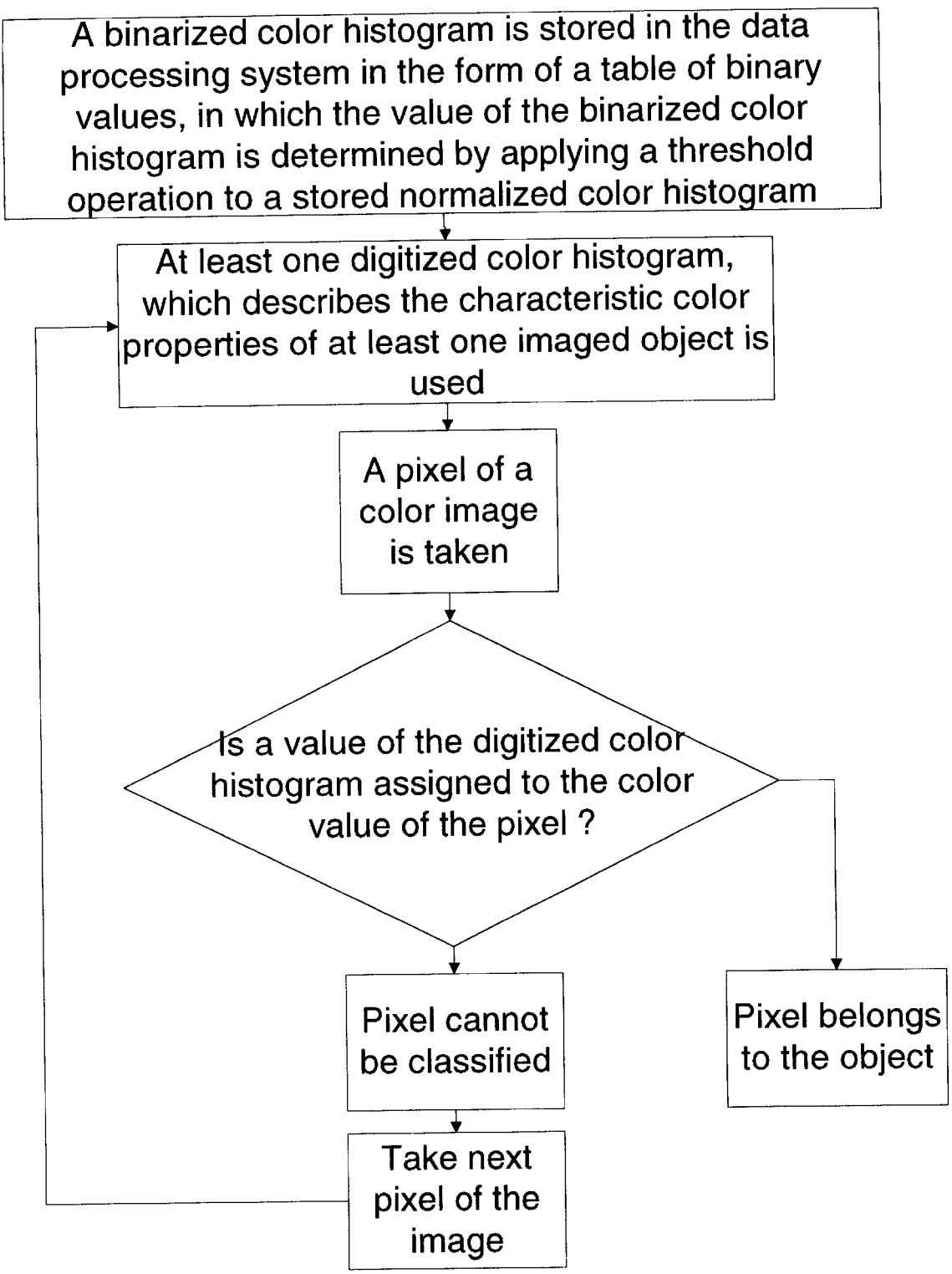
FIG. 3 is a third embodiment of the method of the invention for the segmentation of digital color images.
Figure 4:
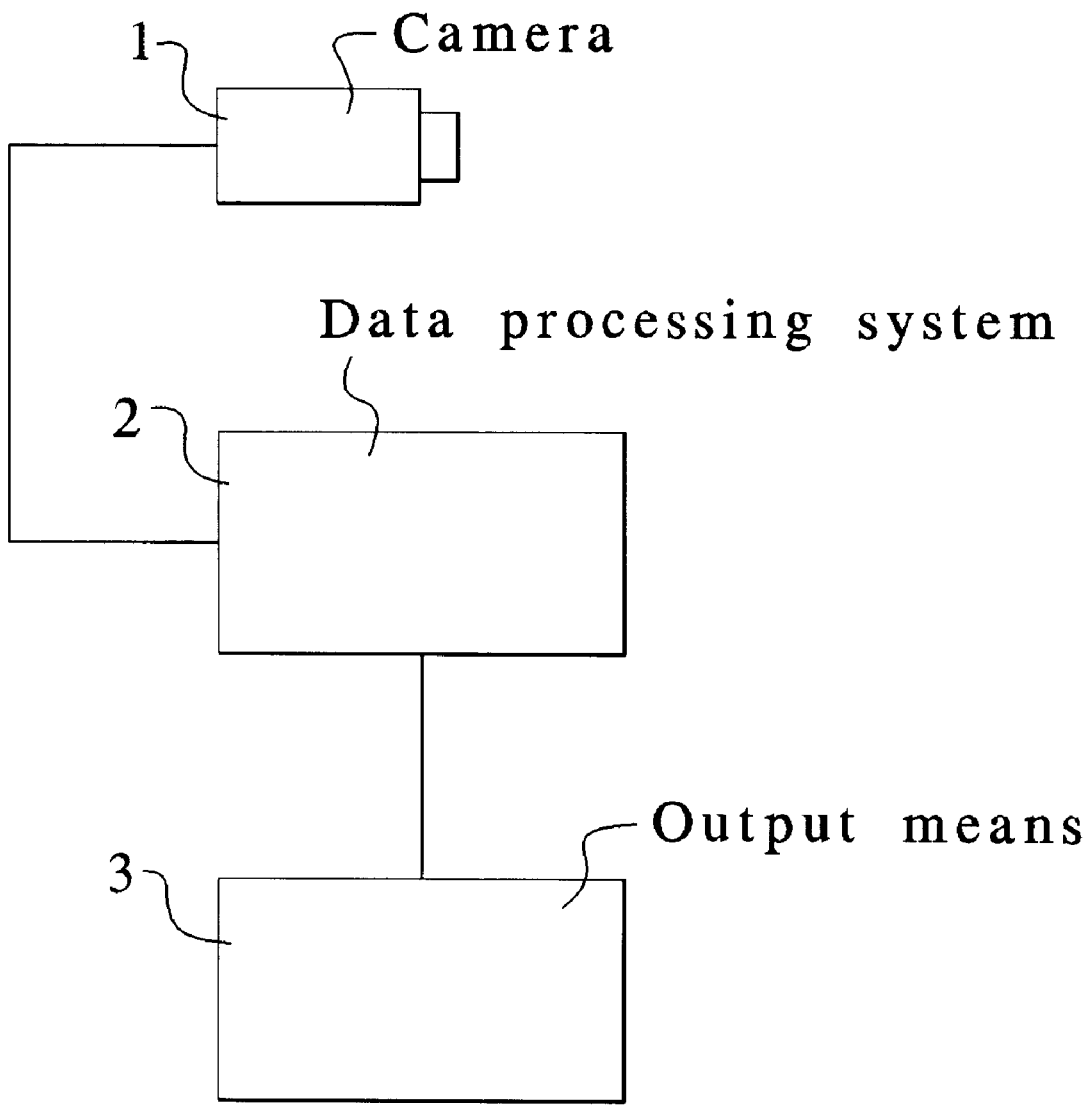
FIG. 4 shows a block diagram of the data processing system, input thereto, and output therefrom employed in the method of the invention for segmentation of digital color images.

The invention is explained in more detail below with the aid of preferred exemplary embodiments as shown in FIGS. 1, 2, and 3. The color of an object which is being taken by a color camera 1 as shown in FIG. 4 is a function of numerous parameters such as, for example, the spectrum of the light source, the geometry of the spatial arrangement, reflective properties of the object surface, or spectral properties of the camera 1. Nevertheless, in the case of natural two- and three-dimensional objects there are typical color distributions and thus also defined structures in the color histogram. A color histogram is understood here to be an empirical frequency distribution of the occurrence of specific color values in a color image or inside an object segment of a color image. In this case, each point of a color space, preferably each point of the three-dimensional RGB space, is assigned a histogram value, specifically a frequency, that is to say the number of pixels which have this color value. If such a histogram is normalized such that the sum of the histogram values over all the points of the color space 1 is produced, the result is what is known as a normalized color histogram. Each value of this color histogram can then be interpreted as a probability for the occurrence of a specific color value in the relevant image. L. A. Shafer showed in 1984 that in the color histogram dichromatic materials with highlights form a parallelogram whose properties are determined by body reflection and surface reflection vectors. Three years later Klinker and Gershon observed independently of one another that this parallelogram is not filled up simultaneously, but can be described by a T-shape, which is also known as a dog leg (Klinker, G. J., Shafer, S. A., Kanade, T. "Using a color reflecting model to separate highlights from objects color". Image Understanding Workshop Proceedings, Los Angeles, February 1987), (Gershon, R. The Use of Color in Computational Vision, DHP Dissertation, University of Toronto, 1987). Typical histograms of color objects comprise so-called clusters,, that is to say coherent regions in the color histogram which are occupied by significant values.

Starting from such histogram structures, the present patent application defines below three models which take account, in their different complexity, of the different reflective properties of objects. Unlike in the abovementioned works, an exact mathematical description of the distribution inside the clusters is developed which contains both the directional components and the variances of the clusters. These models are particularly suitable for representing color objects in color histogram space. These three models, an ellipsoid model, a cylinder model and a mixing density model, are selected in structure and complexity such that they are a good approximation to the typical histograms of real color objects. By contrast with earlier works, in which only the principal components of the object histograms were investigated, at issue here is a complete and exact description of the object histograms including all the disturbing influences such as camera noise, highlights, overdriving, etc.

An object histogram, that is to say a frequency distribution in the space of all the color values including all the pixels of an object can be generated from a digital color image. The object histogram is preferably regarded as a discrete, three-dimensional probability distribution, and for this reason the normalization $$H(v) = \{h(v_1), \ldots, h(v_n)\}, \quad \sum_i h(v_i) = 1$$

is selected. The mathematical description of the histogram values for the ellipsoid model, the cylinder model and the mixing density model is represented below. The method for the segmentation of digital color images according to the invention employs as shown in FIG. 4 a color camera 1, a data processing system 2, and an output means 3. The camera is employed to record the color image. The data processing system then creates the histogram and performs the segmentation of the digital color image according to the previously mentioned ellipsoid model, cylinder model, and mixing density model described in greater detail hereafter. The resulting segmentation of the digital color image is then presented at the output means 3.

Ellipsoid model

A Gaußian function with a diagonal covariance matrix is suitable for describing relatively simple, compact clusters having an ellipsoidal extent and an internal distribution which can be described by a simple or a multivariant, three-dimensional Gaußian function. Such a model is suitable for simple color objects which are lit relatively uniformly. On the one hand, owing to its axially symmetric properties, this function has only limited adaptability. On the other hand, only six free parameters need be determined. Extending this function by the covariances produces the general multivariant normal distribution with non-vanishing covariances. It is also possible using this function to describe clusters which are, for example, axially symmetric relative to the diagonal of the xy-plane. If the symmetry of the covariance matrix is borne in mind, there are nine free parameters to determine in the case of this function.

In principle, the parameters can be determined directly using the standard equations of probability calculus. In order to improve the accuracy, use is made in addition of an iterative method which minimizes the squares of the errors $$E(p) = \sum_i [f(v_i, p) - h(v_i)]^2.$$

In this case, p includes the unknown function parameters. The results of direct determination of parameters are used as initial values for the iterative method. Use can be made, for example, of a statistical optimization method for a plurality of variables without secondary conditions for the purpose of minimizing E(p) (Papageorgiou, M. Optimierung: statische, dynamische, stochastische Verfahren für die Anwendung [Optimization: static, dynamic, stochastic methods for application], R. Oldenbourg Verlag (1991)).

Cylinder model

This model is particularly suitable for long, approximately axially symmetric clusters which can be described in sections by cylindrical disks. This model is particularly suitable for three-dimensional color objects without prominent highlights. The cluster centroid b and the direction of the principal axis a are determined for the mathematical description of this cluster form. Accordingly, a coordinate transformation is applied such that the x-axis points in the direction of the principal cluster axis. The weighted cluster centroid is calculated from $$b = \frac{1}{n} \sum_{i=1}^{n} v_i h(v_i).$$

The principal axis $a=q1$ is determined by calculating the eigenvectors $$A=QSR^T \text{ where } A=[h(v_1)(v_1-b) \ldots h(v_n)(v_n-b)]$$

$$\text{and } Q = [q_1 \ q_2 \ q_3], S = \begin{bmatrix} \lambda_1 & 0 & 0 & 0 \\ 0 & \lambda_2 & \ldots & 0 \\ 0 & 0 & \lambda_3 & 0 \end{bmatrix}, R = [r_1 \ldots r_n].$$

Unlike in the conventional eigenvalue analysis in three-dimensional vector space, here the histogram values are also included as weights of the individual vectors. The equation for, the coordinate transformation is then $$v'_i = (v_i - b) R_y R_z \text{ for } i=1 \ldots n$$

in which $R_y$ and $R_z$ are the rotation matrices for the rotation about the y- and z-axes, respectively. The angles of rotation are yielded directly from the direction vector a. A new scaling using Δl-steps and discretization using l∈Z are now undertaken on the x'-axis. As a result, the cluster is divided into thin disks whose histogram values hl (x',y') can be approximated, for example, using a two-dimensional Gaußian function $$f_1(y', z') = \frac{1}{2\pi\sigma_{y'}\sigma_{z'}} \exp\left(-\frac{1}{2}\left(\frac{(y' - \mu_{y'})^2}{\sigma_{y'}^2} + \frac{(z' - \mu_{z'})^2}{\sigma_{z'}^2}\right)\right)$$

This description can be extended by the covariances, as in the case of the ellipsoid model. Here, as well, an iterative method is used for enhanced accuracy. For small Δl, the cylinder model can provide a very accurate description of axially symmetric cluster forms.

Mixing density model

This model describes the cluster as a mixing density of density functions. The model can describe clusters of arbitrary type and is therefore suitable for complex color objects having highlights, texture, etc. The abovementioned T-shaped reflection model can also be described using the mixing density model.

It is to be noted in this case that it is also possible to combine a plurality of models of the same or different type for the complete representation of a color object. A two-color three-dimensional object having a highlight can, for example, be combined from two cylindrical and one ellipsoid cluster.

The mixing density model is described by the summation of i weighted density functions $$p(v_k|\theta) = \Sigma_i \alpha_i n(v_k, \theta_i) \text{ where } \Sigma_i \alpha_i = 1 \text{ and } \alpha_i \geq 0$$

where $n(v_k, \theta_i)$ can be an arbitrary density function. $\theta_i$ includes the parameters of a density function, θ includes the parameters $\theta_i$ and the weights $\alpha_i$ of all the i density functions. The parameters are determined by the EM algorithm (expected maximum). In this iterative method, the updating equations for the next iteration are given by $$\alpha_i^+ = \frac{\sum_{k=1}^{n} h(v_k) \cdot p^c(i|v_k)}{\sum_{k=1}^{n} h(v_k)}, \quad \mu_i^+ = \frac{\sum_{k=1}^{n} v_k \cdot h(v_k) p^c(i|v_k)}{\sum_{k=1}^{n} h(v_k) p^c(i|v_k)}$$

and $$\Sigma_i^+ = \frac{\sum_{k=1}^{n} (v_k - \mu_i^c)(v_k - \mu_i^c)^T \cdot h(v_k) p^c(i|v_k)}{\sum_{k=1}^{n} h(v_k) p^c(i|v_k)}, \text{ where}$$

$$p^c(i|v_k) = \frac{\alpha_i^c \cdot n(v_k|\theta)}{p(v|\theta^c)}$$

By contrast with the Standard EM algorithm, this formulation also takes account of the weighting of the histogram elements h(v).

By way of example, Redner, R. A. and Walker, H. F. Mixture Densities, Maximum Likelihood and the EM Algorithm. SIAM Review 26, 2 (April 1984), 195–239, and Nowlan, S. J. Maximum Likelihood Competitive Learning. In Advances in Neural Information Processing Systems 4, 574–582, 1990 provide an overview, suitable for the purposes of this patent application, of the problem area of the EM algorithm and of the representation of an example of application.

In many known methods relating to histogram-based color image segmentation, the intensity component of the color is eliminated by the calculation of color value components (Richter, M. Einführung in die Farbmetrik [Introduction to Colorimetry], Walter de Gruyter, 2nd Ed. 1980) and the classification in the two-dimensional plane, which is also referred to as the color table (Batchelor, B. G. "Color Recognition in Prolog", in SPIE Machine Vision Applications, Architectures and Systems Integration, SPIE, 1992). This normalization on the one hand produces good color stability, but on the other hand has the disadvantage that as a result the dimension of the color space is reduced by 1, resulting in some circumstances in the loss of important classification features. In this connection, the above described models are suitable for color image segmentation in the three-dimensional color space having the two classes "object" and "background". It is necessary for this purpose to transform the continuous range of values of the histogram or of the parameterized model function which represents the histogram into a binary range of values. In all three models, the digitization is achieved by means of simple threshold formation $$f_b(v) = \begin{cases} 0 & \text{for } f_{1,2}(v) \geq \epsilon \text{ or } p(v_k|\theta) \geq \epsilon \\ 1 & \text{otherwise} \end{cases}.$$

The threshold value ϵ is a function of the targeted accuracy of the color object segmentation and the color distribution in the object background. If the object background is known, the determination of the threshold value can be automated. The digitized, three-dimensional model functions can be used directly for the purpose of carrying out the classification of object/background in a color image. This solution is, however, neither particularly economical in terms of memory nor particularly efficient in terms of time. It is therefore frequently advantageous precisely in the case of implementations of the method which are capable of real time operation, to represent the model functions by tables having an efficient access mechanism. The method according to the invention was applied to real image data for all three models described, and the respective approximation errors were compared with one another. The RGB color images used were taken with a CCD camera. Neon nitride lamps with a color temperature of 3200 kelvins were used as light sources. The histograms each have a resolution of 64×64×64 color values. The quality of the three model functions was compared with the aid of real images. The sum of the squares of the errors was used as a measure of the quality. As is to be expected, the most flexible, specifically the mixing density model achieves the slightest deviations in each case for all images, and is thus best suited to approximate color object histograms. Depending on the application, however, the other model functions can have advantages, since they permit a simpler and less expensive description of color images.

The following publications were cited in this patent application:
1. Shafer, S. A. Optical phenomena in computer Vision, Proceedings of the CSCSI-84, Canadian Society for Computational Studies of Intelligence, London, Ontario, Canada, May 1984.
2. Nayar, S. K., Ikeuchi, K. and Kanada, T. Surface Reflection: Physical and Geometrical Perspectives, PAMI 13,7 (July 1991), 611–634.
3. Celenk, M. A., Color Clustering Technique for Image Segmentation, Computer Vision, Graphics and Image Processing 52 (1990), 145–170.
4. Swain, M. J. and Ballard, D. H., Color Indexing. International Journal of Computer Vision 7 (1991), 11–32.

5. Sato, Y. and Ikeuchi, K., "Temporal-Color Space Analysis", Carnegie-Mellon-University, Technical Report No. CMU-CS-92-207, November 1992.
6. Klinker, G. J., Shafer, S. A., Kanade, T. "Using a color reflecting model to separate highlights from objects color". Image Understanding Workshop Proceedings, Los Angeles, February 1987.
7. Gershon, R. The Use of Color in Computational Vision, DHP Dissertation, University of Toronto, 1987.
8. Papageorgiou, M. Optimierung: statische, dynamische, stochastische Verfahren für die Anwendung [Optimization: static, dynamic, stochastic methods for application], R. Oldenbourg Verlag (1991).
9. Redner, R. A. and Walker, H. F. Mixture Densities, "Maximum Likelihood and the EM Algorithm". SIAM Review 26, 2 (April 1984), 195–239.
10. Nowlan, S. J. "Maximum Likelihood Competitive Learning", in Advances in Neural Information Processing Systems 4, 574–582, 1990.
11. Richter, M. Einführung in die Farbmetrik [Introduction to Colorimetry], Walter de Gruyter, 2nd Ed. 1980.
12. Batchelor, B. G. "Color Recognition in Prolog", in SPIE Machine Vision Applications, Architectures and Systems Integration, SPIE, 1992.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for segmentation of digital color images with an electronic data processing system, comprising the steps of:

employing at least one binarized color histogram which describes the characteristic color properties of at least one imaged object for determining whether a pixel of a color image which is to be decomposed into object segments belongs to a specific object segment or not; and checking whether there is assigned to said color value of said pixel a value of the binarized color histogram belonging to this object which indicates association of said pixel with said specific object segment.

2. The method according to claim 1 wherein the binarized color histogram is stored in the data processing system in the form of a table of binary values which assigns a first binary value to each color value which belongs to an object characterized by the color histogram, and assigns an opposite binary value to all other color values.

3. The method according to claim 1 in which values of the binarized color histogram are determined by applying a threshold operation to a normalized color histogram which is stored in the data processing system as a set of parameters of a parametric function.

4. The method according to claim 3 wherein the values of the parameters are adapted in a stepwise fashion to a temporally varying lighting.

5. The method according to claim 1 in which values of the binary color histogram are determined by applying a threshold operation to a normalized color histogram which is stored in the data processing system as a set of parametric functions.

6. The method according to claim 1 in which three-dimensional color histograms are used.

7. A method for segmentation of digital color images with an electronic data processing system, comprising the steps of:

employing at least one digitized color histogram which describes the characteristic color properties of at least one imaged object for determining whether a pixel of a color image which is to be decomposed into object segments belongs to a specific object segment or not;

determining the digitized color histogram by applying a threshold operation to a normalized color histogram which is stored in the data processing system as a set of parameters of a parametric function; and checking whether there is assigned to said color value of said pixel a value of the digitized color histogram belonging to this object which indicates association of said pixel with said specific object segment.

8. The method according to claim 7 wherein the values of the parameters are adapted in a stepwise fashion to a temporally varying lighting.

9. A method for segmentation of digital color images with an electronic data processing system, comprising the steps of:

employing at least one digitized color histogram which describes the characteristic color properties of at least one imaged object for determining whether a pixel of a color image which is to be decomposed into object segments belongs to a specific object segment or not;

determining values of the digitized color histogram by applying a threshold operation to a normalized color histogram which is stored in the data processing system as a set of parametric functions; and checking whether there is assigned to said color value of said pixel a value of the digitized color histogram belonging to this object which indicates association of said pixel with said specific object segment.

* * * * *